United States Patent
Roberts et al.

(10) Patent No.: US 7,408,009 B2
(45) Date of Patent: Aug. 5, 2008

(54) HYDROGENATION OF POLYMERS IN THE PRESENCE OF SUPERCRITICAL CARBON DIOXIDE

(75) Inventors: George W. Roberts, Raleigh, NC (US); Dawei Xu, Raleigh, NC (US); Douglas J. Kiserow, Cary, NC (US); Ruben G. Carbonell, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 10/533,625

(22) PCT Filed: Nov. 3, 2003

(86) PCT No.: PCT/US03/35217

§ 371 (c)(1),
(2), (4) Date: Apr. 11, 2007

(87) PCT Pub. No.: WO2004/052937

PCT Pub. Date: Jun. 24, 2004

(65) Prior Publication Data

US 2007/0270554 A1    Nov. 22, 2007

(51) Int. Cl.
*C08C 19/02*    (2006.01)
*C08F 8/04*    (2006.01)

(52) U.S. Cl. .............. 525/338; 525/333.3; 525/339
(58) Field of Classification Search ............ 525/338, 525/333.3, 339
See application file for complete search history.

(56) References Cited

U.S. PATENT DOCUMENTS

| 3,969,382 | A |   | 7/1976 | Zosel |
| 5,612,422 | A | * | 3/1997 | Hucul et al. ............... 525/338 |
| 6,172,165 | B1 |   | 1/2001 | Hucul et al. |
| 6,395,841 | B1 |   | 5/2002 | Calverley et al. |
| 6,399,538 | B1 |   | 6/2002 | Hucul |
| 6,417,287 | B1 |   | 7/2002 | Wege et al. |
| 6,420,491 | B1 | * | 7/2002 | Wege et al. ............... 525/338 |
| 6,894,193 | B2 | * | 5/2005 | Zehner et al. ............. 564/420 |

FOREIGN PATENT DOCUMENTS

| GB | 2 374 071 A | * | 10/2002 |
| GB | 2374071 A |   | 10/2002 |
| WO | WO 97/38955 | * | 10/1997 |

OTHER PUBLICATIONS

Xu et al. "The hydrogenation of polystyrene facilitated by supercritical Carbon Dioxide", Southeastern Catalysis Society Spring Symposium, Apr. 13-14, 2003.*
International Search Report for PCT/US03/35217; Date of mailing Nov. 5, 2004.
Bates F S et al. PCHE-Based Pentablock Copolymers: Evolution of a New Plastic. AIChE Journal (Apr. 2001), vol. 47, No. 4, pp. 762-764.
Hucul D A et al. Catalytic Hydrogenation of Polystyrene. Advanced Materials (Dec. 1, 2000), vol. 12, No. 23, pp. 1855-1858.
Gehlsen M D et al. Synthesis and Characterization of Poly(vinylcyclohexane) Derivatives. Journal of Polymer Science: Part B: Polymer Physics (1995), vol. 33, pp. 1527-1536.
Xu D et al. The Hydrogenation of Polystyrene Facilitated by Supercritical $CO_2$. Southeastern Catalysis Society Spring Symposium (Apr. 13-14, 2003), Program and Abstract.
Xu D et al. Kinetic and Transport Processes in the Heterogeneous Catalytic Hydrogenation of Polystyrene. Industrial & Engineering Chemistry Research (2003), vol. 42, No. 15, pp. 3509-3515.

* cited by examiner

*Primary Examiner*—Ling-Siu Choi
(74) *Attorney, Agent, or Firm*—Myers Bigel Sibley & Sajovec

(57) ABSTRACT

A method of hydrogenating a polymer comprises: (a) providing a dense phase, the dense phase comprising a polymer in a solvent; (b) providing a catalyst system, the catalyst system comprising as least one metal hydrogenation catalyst (preferably including nickel or ruthenium); and (c) providing a light phase, the light phase comprising, consisting of or consisting essentially of hydrogen and carbon dioxide; and (d) contacting the dense phase, the light phase and the catalyst system under conditions in which the hydrogen reacts with the polymer and hydrogenates the polymer.

24 Claims, 4 Drawing Sheets

HYDROGENATION OF POLYMERS IN THE PRESENCE OF SUPERCRITICAL CARBON DIOXIDE

GOVERNMENT SUPPORT

This invention was made with Government support under Grant DAAG55-98-D-0003 from the U.S. Army Research Office and Agreement No. CHE-9876674 from the STC Program of the National Science Foundation. The US Government has certain rights to this invention.

RELATED APPLICATIONS

This application claims the benefit of U.S. Provisional Application Ser. No. 60/423,804, filed Nov. 5, 2002, the disclosure of which is incorporated by reference herein in its entirety.

FIELD OF THE INVENTION

The present invention concerns methods of hydrogenating polymers such as polystyrene.

BACKGROUND OF THE INVENTION

Hydrogenation of some commercial polymers can produce new polymeric materials that are difficult or expensive to synthesize by other means, e.g., by polymerization of the corresponding monomer(s). For example, polystyrene (PS) can be hydrogenated to produce poly(vinyl cyclohexane) (PVCH). The glass transition temperature of PVCH is about 50° C. higher than that of PS (150° C. versus 100° C.), and PVCH may be able to compete with poly(bisphenol A carbonate), a more expensive polymer than PS, in some high-temperature applications.

Despite the potential advantages of hydrogenating inexpensive, commercially-available polymers to create more valuable materials, hydrogenation of polymers is not widely practiced on a commercial scale. A solid catalyst is required to carry out such hydrogenations selectively, at a reasonable rate. The viscosity of a solution of polymer in a solvent is very high, even if the concentration of the polymer in the solution is relatively low. The high viscosity of the polymer solution causes at least two serious problems: First, if the hydrogenation is carried out by suspending small catalyst particles in the polymer solution, these particles are very difficult to separate from the final solution of the hydrogenated polymer when the reaction is complete. Because of the high viscosity of the solution, separation techniques such as filtration, sedimentation, and centrifugation can become impracticably slow. Second, the high viscosity of the solution causes the heat and mass transfer coefficients to be low between the solution and the catalyst particles, and between the solution and the fluid phase that contains the $H_2$. These low coefficients, in turn, lower the rate of hydrogenation and increase the temperature of the catalyst particles. The higher temperature of the catalyst particles can lower the selectivity of the reaction, i.e., undesired hydrogenation reactions such as chain scission can occur.

In a conventional hydrogenation, using a catalyst with a small particle size (0.1 to 100 μm) that is dispersed in the liquid phase, the transport limitation between the gas phase and the liquid (polymer solution) can be reduced or eliminated by employing a high rate of mechanical agitation. This is illustrated in FIG. 1, which shows the results of hydrogenating a solution of polystyrene in decahydronaphthalene in a 50 cc stirred autoclave equipped with a mechanical agitator. The extent to which the phenyl groups of polystyrene have been hydrogenated in a fixed period of time, at a fixed set of conditions, is plotted against the rotational speed of the agitator. Note that the extent of ring hydrogenation increases as the rotational speed of the agitator is increased, up to a speed of about 2000 rpm. Above 2000 rpm, the rate of ring hydrogenation is no longer sensitive to stirring speed. This shows that an agitation rate of greater than 2000 rpm is required to essentially eliminate the resistance to $H_2$ transfer between the gas phase and the liquid phase at the conditions of FIG. 1.

Unfortunately, varying the rotational speed or the design of the agitation system has no little or no effect on the transport resistance between the liquid phase and a small catalyst particle that is suspended in the liquid. Moreover, the agitation rate/agitator design has no effect on the internal (pore diffusion) transport resistance. Consequently, increasing the agitation rate is only a partial solution to the second problem described above, and it does not contribute to solving the first problem. Accordingly, there is a need for new techniques for carrying out hydrogenation reactions on polymers.

SUMMARY OF THE INVENTION

The present invention provides a method of hydrogenating a polymer. In general, the method comprises:

(a) providing a dense phase, the dense phase comprising, consisting of or consisting essentially of a polymer in a solvent;

(b) providing a catalyst system, the catalyst system typically comprising at least one metal hydrogenation catalyst and preferably comprising at least one metal hydrogenation catalyst immobilized on a solid support or particle; and (c) providing a light phase, the light phase comprising, consisting of or consisting essentially of hydrogen and carbon dioxide; and (d) contacting the dense phase, the light phase and the catalyst system under conditions in which the hydrogen reacts with the polymer and hydrogenates the polymer.

The present invention is explained in greater detail in the drawings herein and the specification set forth below.

DETAILED DESCRIPTION OF THE PREFERRED EMBODIMENTS

As noted above, the present invention provides a method of hydrogenating a polymer. Suitable polymers that can be used to carry out the present invention include, but are not limited to, polystyrene, poly(bisphenol A carbonate), poly(ethylene terephthalate), polybutadiene and copolymers thereof, and polyisoprene and copolymers thereof. Hydrogenated polymers are produced from the foregoing; for example polystyrene can be hydrogenated by the method of the invention to produce polycyclohexylethylene.

Figure 5:
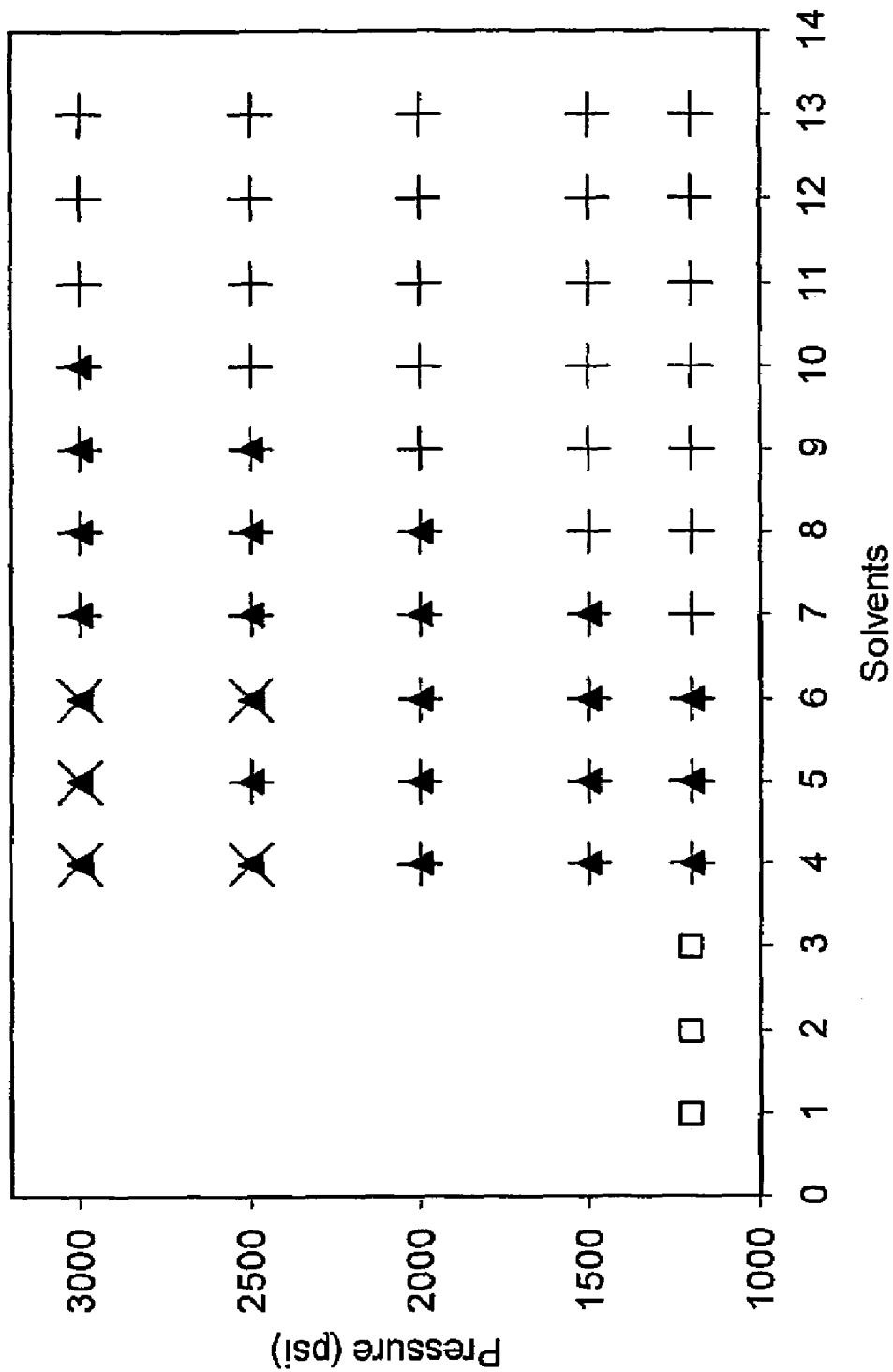
FIG. 5 shows the solubility of 10 wt. % polystyrene in various solvents at 120° C. at various $CO_2$ pressures. KEY: No mark—PS insoluble; x—one fluid phase; +—two fluid phases; s—precipitation of polymer. 1-n-hexane, 2-tetradecane, 3-n-hexylcyclohexane, 4-tetrahydrofuran, 5-cyclohexane, 6-methylcyclohexane, 7-ethylcyclohexane, 8-α-phellandrene, 9-isopropyl benzoate, 10-decahydronaphthalene, 11-dicyclohexyl, 12-cyclohexylbenzene, 13-tetrahydronaphthalene.

Solvents for polymers as described above are, in general, organic solvents. The solvent should be chosen so that the polymer is soluble in the solvent both before and after the application of the carbon dioxide. In general, suitable solvents for the reaction are saturated, fused ring, aliphatic compounds that may contain or be substituted with (preferably saturated) alkyl groups (e.g. linear or branched C1-C4 alkyl). Examples of suitable solvents include but are not limited to dicyclohexyl, cyclohexylbenzene, tetrahydronaphthalene, etc. Note that, when the solvent is unsaturated at the beginning of the hydrogenation reaction, the solvent itself can be hydrogenated as the reaction progresses. Hence, unsaturated aliphatic solvents that are subsequently hydrogenated and saturated can also be used to carry out the invention. FIG. 5 sets forth data on illustrative solvents that can and cannot be used to carry out the present invention.

The metal hydrogenation catalyst may be any suitable catalyst, including but not limited to platinum, palladium, rhodium, copper, molybdenum, rhenium, tungsten, cobalt, and combinations thereof In some embodiments, the inclusion of nickel or ruthenium as the catalyst (the sole catalyst or in combination with other catalysts as described above) is preferred. Without wishing to be bound to any particular theory for the present invention, it is believed that nickel and ruthenium, which are methanation catalysts as well as hydrogenation catalysts, facilitate the methanation reaction: $CO+3H_2 \to CH_4+H_2O$, thereby converting CO that might otherwise poison the catalyst to an innocuous form. Hence, in some embodiments, the catalyst system includes at least one metal methanation catalyst, which may be the same or different from the metal hydrogenation catalyst.

Metal catalysts are generally coupled to or immobilized on a solid support. Any suitable support (generally porous particles or beads) may be utilized. Suitable solid supports include but are not limited to carbon (including activated carbon), silica, alumina, silica-alumina, calcium carbonate, and barium sulfate. Where two or more different metal catalysts are used in the catalyst systems, the different metals may be on the same support or on different supports. The size of the catalyst particle is not critical, and will generally depend upon the reaction apparatus employed, with fixed-bed reactors utilizing larger-sized particles than slurry reactors. In general, from about 0.1 to 1 weights of catalyst system per weight of polymer is utilized, or included, in the contacting step. A homogeneous catalyst that is soluble in the dense phase may also be used.

The dense phase, as noted above, comprises a polymer and a solvent. In general, the catalyst particles are suspended in the dense phase. In general, from 0.1 to 10 or 20 weight percent of the polymer is included in the dense phase. The dense phase is preferably a liquid. The dense phase may be a viscous liquid, in general having a viscosity of from 1 to 10 or even 100 centipoise (at reaction temperature before the hydrogenation reaction begins). The viscosity of the dense phase is preferably reduced by application of or contacting to the carbon dioxide, preferably to at least one half, and more preferably to at least one quarter of the viscosity prior to application of the carbon dioxide. In some embodiments the viscosity of the dense phase is reduced to one-tenth or less after contacting to carbon dioxide.

In certain embodiments the heavy or dense phase consists essentially of solvent and polymer, without deliberate addition of other ingredient which do not participate in the reaction. Of course, such a heavy phase will necessarily have some small amounts of components of the light phase, e.g. carbon dioxide and hydrogen, partitioned therein. Similarly, in certain embodiments the light phase consists essentially of carbon dioxide and hydrogen, without deliberate addition of other ingredients which do not participate in the reaction. Again, such a light phase will necessary have some small amounts of components of the heavy phase, e.g., polymer and solvent, partitioned therein.

The contacting step may be carried out at a carbon dioxide pressure of 100 to 1500, 2500 or 3000 psi or more, and With a hydrogen pressure of 100 to 1500 or 2000 psi, or more. The light phase is preferably a supercritical fluid, though in some embodiments the light phase may be a gas. In general, the contacting step is carried out at a temperature of 0, 50 or 100° C. up to 200 or 300° C. The contacting step may be a batch or continuous contacting step, and when a continuous step may be carried out in a slurry reactor (e.g., slurry bubble column reactors) or fixed bed reactor (e.g., trickle bed reactors, two-phase upflow reactors) in accordance with known techniques. The time of the contacting step is not critical and will depend upon the desired degree of polymer hydrogenation. In some embodiments the contacting step is carried out for a time of from 1 or 10 minutes to one or ten hours, or overnight or more.

Hydrogenated polymers produced by the methods of the present invention are useful for a variety of purposes, including but not limited to polymers used in the manufacture of optical informations storage media such as DVD and CD discs.

Depending upon the particular implementation of the present invention, embodiments of the present invention incorporate some or all of the following features.

Polymers are hydrogenated in the presence of a high pressure of $CO_2$

1) A solvent is used that has a high solubility for the polymer and which allows the polymer to remain in solution in the presence of a high pressure of $CO_2$.
2) The hydrogenation can be conducted using a fixed bed of catalyst.
3) A catalyst can be deposited on a monolithic support for use in a fixed-bed reactor.
4) A catalyst is used that has a low activity for the reverse water gas shift reaction.
5) A catalyst with a small particle size (0.1 to 100 μm) is filtered out of the solution of hydrogenated polymer in the presence of a high partial pressure of $CO_2$.
6) The process can be applied to any polymer with olefinic or aromatic unsaturation.

A feature of this invention is that hydrogenation of the polymer is conducted in the presence of supercritical carbon dioxide ($scCO_2$). It is known that the viscosity of a polymer or a polymer solution is lowered when $CO_2$ is dissolved in the polymer/polymer solution. Therefore, carrying out the hydrogenation reaction in the presence of enough $CO_2$ to lower the viscosity of the polymer solution significantly should alleviate the problems described in item 2) listed above. Moreover, filtering the catalyst particles out of the polymer solution in the presence of enough $CO_2$ to lower the viscosity significantly should alleviate the problems described in item 1) listed above.

An apparatus used to carry out the experiments shown in FIGS. 1-5 herein comprises a 50 ml autoclave fitted with an impeller. A carbon dioxide tank is connected through a control valve, a syringe pump, and a second control valve to a feed line, which feed line runs through a third control valve to the autoclave. A hydrogen tank is connected through a fourth control valve to the same feed line as the carbon dioxide tank, the two joining below the second control valve but above the third control valve. The autoclave is fitted with a pressure transducer and pressure indicator, a temperature sensor and temperature indicator, a sample port, a vent and a safety head.

Figure 2:
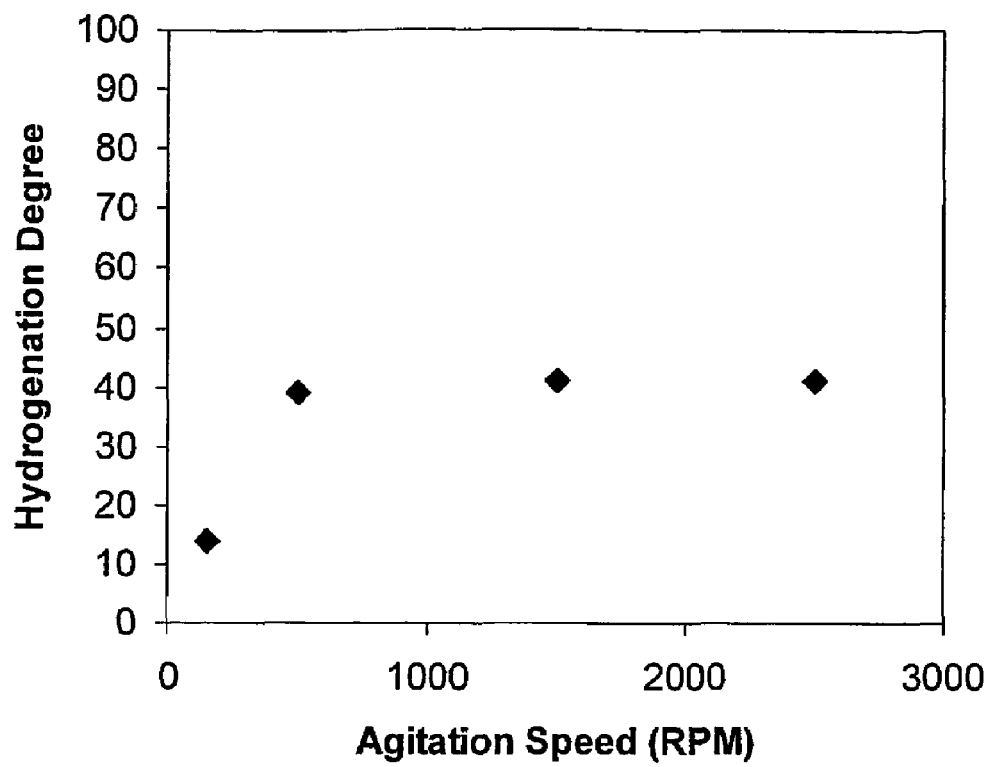
FIG. 2 shows the effect of agitation speed on degree of hydrogenation. Conditions: 3 weight percent polystyrene in decahydronaphthalene; 150° C., 750 psig $H_2$ pressure; 2250 psig $CO_2$ pressure, 1 g. catalyst/g. polystyrene; 10 h. reaction time. Catalyst: 5 wt. % Pd/BaSO$_4$ (Engelhard).

FIG. 2 shows the results of hydrogenating a solution of polystyrene in decahydronaphthalene in the presence of a high pressure of $CO_2$. This figure shows that the agitation rate that is required to eliminate the gas/liquid mass transfer resistance is less than 500 rpm, compared to 2000 rpm for the exact same conditions, but with no $CO_2$ present. Although the viscosity of the solution was not measured in the presence and absence of $CO_2$, it is very likely that the reduction in the required agitation rate was due to a much lower viscosity of the polymer solution as a result of the dissolved $CO_2$. Thus, carrying out the hydrogenation in the presence of $CO_2$ should provide a comprehensive solution to the problems described in 2) above, and carrying out the filtration in the presence of $CO_2$ should make catalyst removal and recovery via filtration much faster and more complete.

Figure 1:
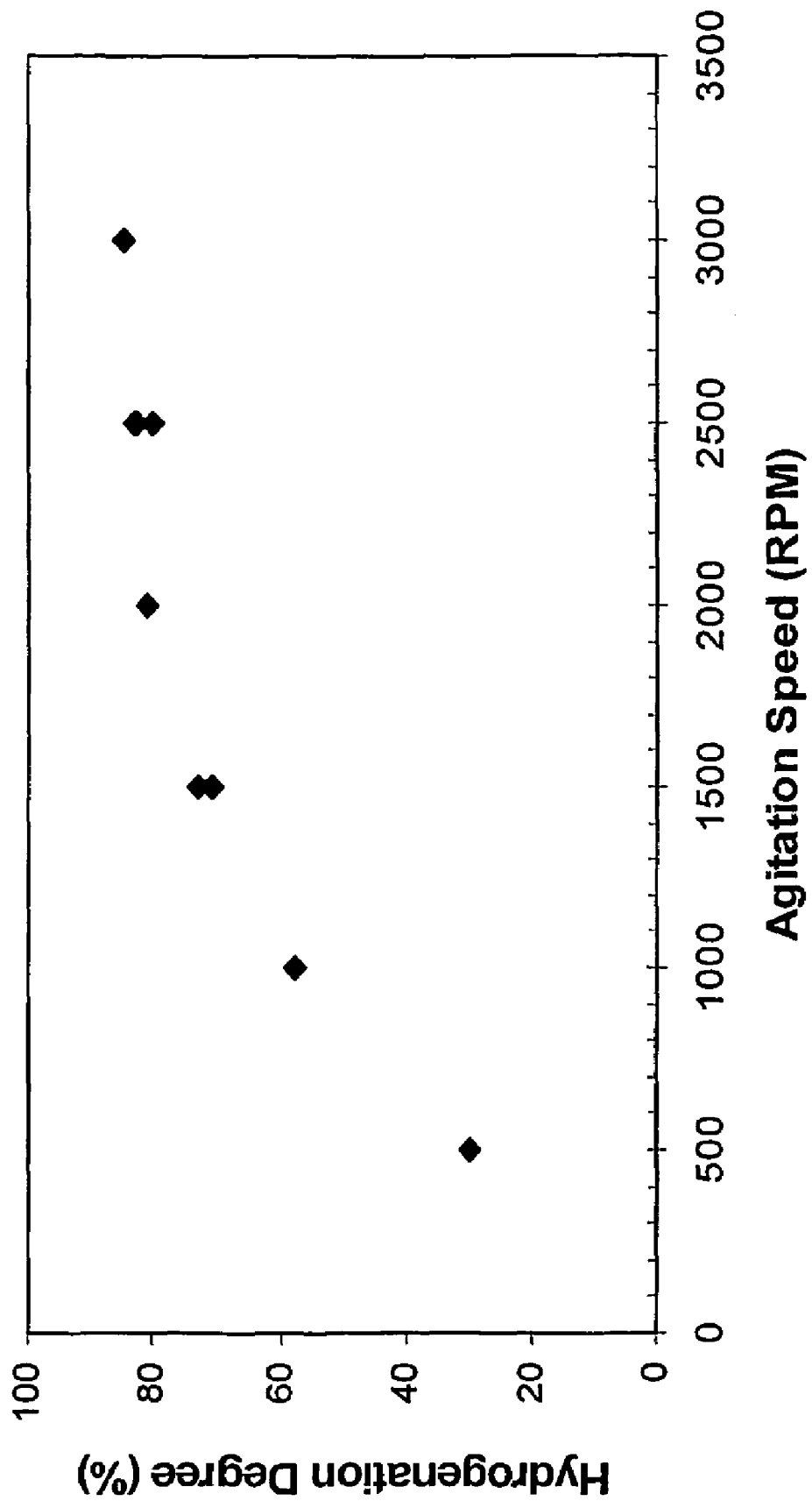
FIG. 1 shows the effect of agitation speed on degree of hydrogenation. Conditions: 3 weight percent polystyrene in decahydronaphthalene; 150° C., 750 psig $H_2$ pressure; 1 g. catalyst/g. polystyrene; 10 h. reaction time. Catalyst: 5 wt. % Pd/BaSO$_4$ (Engelhard).

A comparison of FIGS. 1 and 2 shows one disadvantage of carrying out the hydrogenation in the presence of $CO_2$. The maximum rate, as measured by the extent of ring hydrogenation in the flat portion of the curve, is lower in the presence of $CO_2$ than it is without $CO_2$. This effect is attributed to poisoning of the $Pd/BaSO_4$ catalyst by carbon monoxide (CO) and/or by $H_2O$ that is formed by the reverse water gas shift (rWGS) reaction: $CO_2+H_2 \rightarrow CO+H_2O$.

Figure 3:
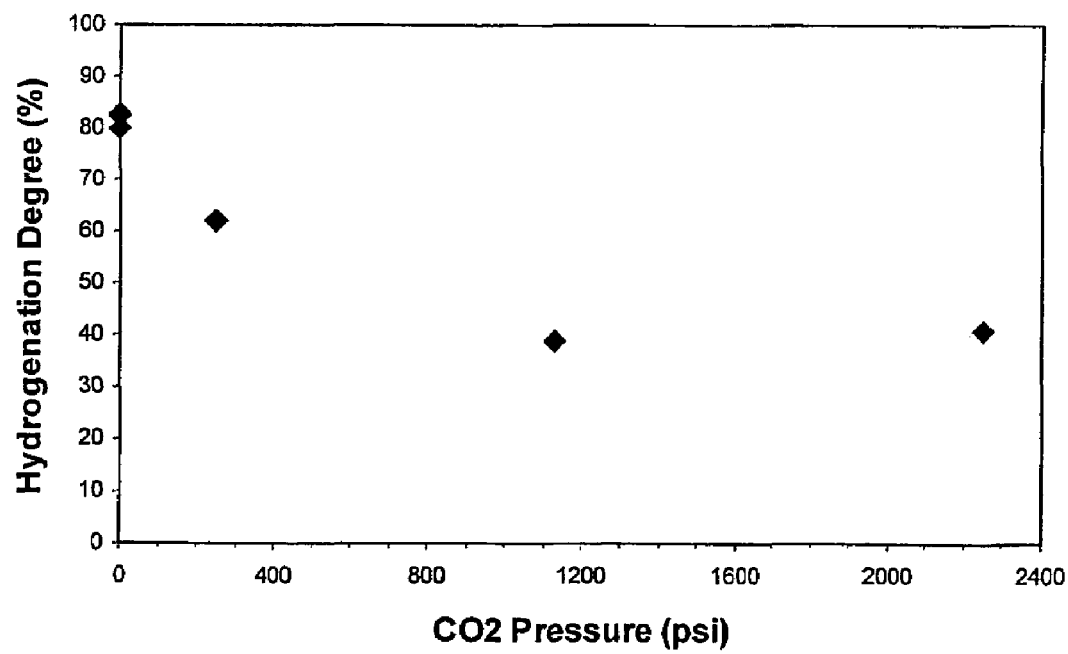
FIG. 3 shows the effect of $CO_2$ pressure on degree of hydrogenation. Conditions: 3 weight percent polystyrene in decahydronaphthalene; 150° C., 750 psig $H_2$ pressure; varying $CO_2$ pressure, 1 g. catalyst/g. polystyrene; 10 h. reaction time. Catalyst: 5 wt. % Pd/BaSO$_4$ (Engelhard).

The effect of varying the $CO_2$ pressure is shown in FIG. 3. With the exception of the $CO_2$ pressure, all of the other variables in FIG. 3 are the same as in FIGS. 1 and 2. The effect shown in FIG. 3 is consistent with the above explanation.

It should be possible to avoid or minimize the negative effect of CO in several ways:

1) CO can be reacted with another compound to form a species that is not harmful to the catalyst activity. Some possible reactions to remove CO are: (i) The methanation reaction, $CO+3 H_2 \rightarrow CH_4+H_2O$. Methane ($CH_4$) does not poison or inhibit most catalysts. This reaction, which is catalyzed by metals such as Ru and Ni, might be an effective means to "scavenge" CO, provided that the co-product, $H_2O$, does not have a negative effect on the catalyst activity. (ii) The oxidation of CO to $CO_2$ by the mineral hopcalite ($MnO_2/CuO$). This oxidation takes place at room temperature. Hopcalite acts as a reagent (oxidizing agent), not as a catalyst. (iii) Selective oxidation of CO in the presence of $H_2$. Certain catalysts, e.g. Pt promoted by iron oxide, can selectively oxidize small quantities of CO (<1%) in the presence of large quantities of $H_2$. Consumption of CO is essentially quantitative, while very little $H_2$ is oxidized to $H_2O$.

2) A catalyst can be used that does not promote the water-gas shift reaction.

Figure 4:
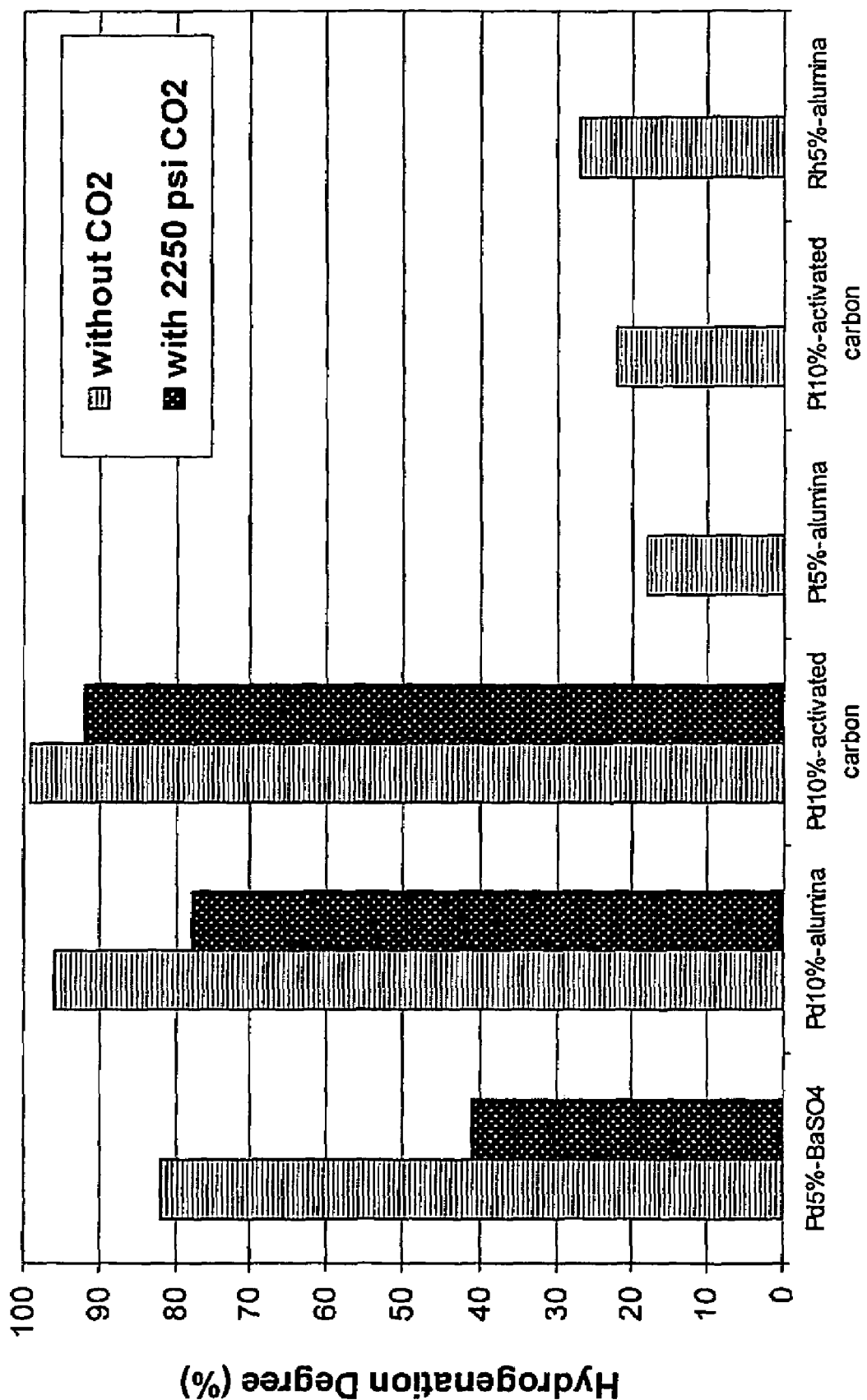
FIG. 4 shows the effect of the presence or absence of carbon dioxide on the degree of hydrogenation for various catalysts. Conditions: 3 weight percent polystyrene in decahydronaphthalene; 150° C., 750 psig $H_2$ pressure, 1 g. catalyst/g. polystyrene; 10 h. reaction time.

FIG. 4 suggests that different catalysts have different relative activities for polystyrene hydrogenation and for the water-gas shift reaction. Note that both 10% Pd/alumina and 10% Pd/activated carbon are more active for polystyrene hydrogenation and less sensitive to the presence of $CO_2$ that the 5% Pd/BaSO4 catalyst that was used for the experiments in FIGS. 1 through 3.

3) A continuous flow of $H_2$ can be used to sweep the CO out of the reactor essentially as fast as it is formed.

The choice of the solvent in which the polymer is dissolved is a critical element of this invention. First, the solvent must be capable of dissolving a substantial quantity of polystryene (greater than about 10 wt. %). Second, the polymer must remain in solution in the presence of a high pressure of $CO_2$ at the temperature of the reaction. FIG. 5 shows the results of testing various potential solvents at 120° C. Cyclohexane (#5), which has been used by others as a solvent for polystyrene hydrogenation, is capable of dissolving 10 wt. % polystyrene. However, in the presence of no more than 1200 psig. of $CO_2$, polystyrene precipitates from cyclohexane. On the other hand, with decahydronaphthalene (#10), the solvent that was used for the experiments in FIGS. 1 through 4, the polystyrene remains in solution until the $CO_2$ pressure exceeds 2500 psig.

Our experiments have also shown that it is desirable to use a solvent that is fully saturated. Hydrogenation of the solvent competes with hydrogenation of the polymer. Using a fully-saturated solvent reduces the amount of $H_2$ that is consumed, and reduces the time required to reach a given degree of polymer hydrogenation.

As a result of the lower viscosity that results from carrying out the polymer hydrogenation in the presence of a high pressure of $CO_2$, the process can be practiced either in a slurry reactor, with small (0.1 to 100 μm) catalyst particles, as was the case for FIGS. 1 though 4, or in a fixed-bed reactor, with either catalyst pellets or with a structured or random monolithic catalyst support. If a fixed-bed reactor is used, it is not necessary to filter the catalyst particles out of the final, hydrogenated, polymer solution. The fixed-bed reactor may operate in either a downflow mode (trickle-bed reactor) or an upflow mode.

The following non-limiting Examples are provided to further illustrate the present invention.

EXAMPLE 1

Combination of Palladium and Nickel Catalysts

This example was carried out the apparatus used in conjunction with FIGS. 1-5 discussed above. A 25 mL solution of 6 wt % polystyrene (PS) in decahydronaphthalene solvent was combined with 1.4 g Pd5%-$BaSO_4$ catalyst and 0.04 g Ni65%-Silica/Alumina catalyst and reacted at 150° C. in contact with 750 psi $H_2$ and 2250 psi $CO_2$ at an impeller speed of 2500 rpm. Samples were taken every hour for five hours with the following results: 1 hr, hydrogenation degree (HD) is 31.4%; 2 hr, HD is 55.7%; 3 hr, HD is 73.4%; 4 hr, HD is 84.4%; 5 hr, HD is 93.6%.

EXAMPLE 2

Combination of Palladium and Nickel Catalysts

This example was carried out the apparatus used in conduction with FIGS. 1-5 discussed above. A 25 mL solution of 6 wt % polystyrene (PS) in decahydronaphthalene solvent was combined with 0.7 g Pd5%-$BaSO_4$ catalyst and 0.02 g Ni65%-Silica/Alumina catalyst and reacted at 150° C. with 750 psi $H_2$ and 2250 psi $CO_2$ at an impeller speed of 2500 rpm. Samples were taken every hour for five hours with the following results: 1 hr, hydrogenation degree (HD) is 22.9%; 2 hr, HD is 38.1%; 3 hr, HD is 52.8%; 4 hr, HD is 57.3%; 5 hr, HD is 64.0%.

EXAMPLE 3

Combination of Palladium and Nickel Catalysts

This example was carried out the apparatus used in conduction with FIGS. 1-5 discussed above. A 25 mL solution of 9 wt % polystyrene (PS) in decahydronaphthalene solvent was combined with 0.7 g Pd5%-$BaSO_4$ and 0.02 g Ni65%-Silica/Alumina and reacted at 150° C. in contact with 750 psi $H_2$, and 2250 psi $CO_2$ at an impeller speed of 2500 rpm. Samples were taken every hour for five hours with the following results: 1 hr, hydrogenation degree (HD) is 7.4%; 2 hr, HD is 29.0%; 3 hr, HD is 37.7%; 4 hr, HD is 45.6%; 5 hr, HD is 50.5%.

The foregoing is illustrative of the present invention, and is not to be construed as limiting thereof. The invention is defined by the following claims, with equivalents of the claims to be included therein.

That which is claimed is:

1. A method of hydrogenating a polymer, comprising the steps of:
    (a) providing a dense phase, said dense phase comprising a polymer in an organic solvent;
    (b) providing a catalyst system, said catalyst system comprising at least one metal hydrogenation catalyst selected from the group consisting of nickel and ruthenium immobilized on a solid support; and
    (c) providing a light phase, said light phase comprising hydrogen and supercritical carbon dioxide; and
    (d) contacting said dense phase, said light phase and said catalyst system so that said hydrogen reacts with said polymer and said polymer is hydrogenated.

2. The method of claim 1, wherein said polymer is selected from the group consisting of polystyrene, poly(bisphenol A carbonate), poly(ethylene terephthalate), polybutadiene and copolymers thereof, and polyisoprene and copolymers thereof.

3. The method of claim 1, wherein said solid support is formed from carbon, silica, alumina, silica-alumina, calcium carbonate or barium sulfate.

4. The method of claim 1, wherein said at least one metal hydrogenation catalyst further comprises a catalyst selected from the group consisting of platinum, palladium, rhodium, copper, molybdenum, rhenium, tungsten, cobalt, and mixtures thereof.

5. The method of claim 1, wherein said metal hydrogenation catalyst is nickel.

6. The method of claim 1, wherein 0.1 to 1 weights of catalyst per weight of polymer are included in said contacting step.

7. The method of claim 1, wherein from 0.1 to 20 weight percent of said polymer is included in said dense phase.

8. The method of claim 1, wherein said contacting step is carried out at a hydrogen pressure of 100 to 2000 psi.

9. The method of claim 1, wherein the viscosity of said dense phase at reaction temperature prior to said contacting step is from 1 to 100 centipoise, and wherein the viscosity of said dense phase after said contacting step decreased by at least half thereof.

10. The method of claim 1, wherein said dense phase comprises a liquid.

11. The method of claim 1, wherein said contacting step is carried out at a temperature of 50 to 300° C.

12. The method of claim 1, wherein said contacting step is a batch contacting step.

13. The method of claim 1, wherein said contacting step is a continuous contacting step.

14. The method of claim 1, wherein said contacting step is carried out in slurry reactor.

15. The method of claim 1, wherein said contacting step is carried out in a fixed bed reactor.

16. The method of claim 1, wherein said contacting step is carried out in a fixed bed reactor selected from the group consisting of trickle bed reactors and two-phase upflow reactors.

17. A method of hydrogenating a polymer, comprising the steps of:
    (a) providing a liquid dense phase, said dense phase consisting essentially of a polymer in an organic solvent, said polymer selected from the group consisting of polystyrene, poly(bisphenol A carbonate), poly(ethylene terephthalate), polybutadiene and copolymers thereof, and polyisoprene and copolymers thereof, with said solvent included in said dense phase in an amount of from 0.1 to 20 weight percent;
    (b) providing a solid catalyst system, said catalyst system comprising at least one metal hydrogenation catalyst selected from the group consisting of nickel and ruthenium immobilized on a solid support; and
    (c) providing a light phase, said light phase consisting essentially of hydrogen at a pressure of 100 to 2000 psi and supercritical carbon dioxide; and
    (d) contacting said dense phase, said light phase and said catalyst system at a temperature of 50 to 300° C., and in an amount of 0.1 to 1 weight of catalyst system per weight of polymer, to react said hydrogen with said polymer and said polymer is hydrogenated.

18. The method of claim 17, wherein the viscosity of said dense phase prior at reaction temperature to said contacting step is from 1 to 100 centipoise, and wherein the viscosity of said dense phase after said contacting step is decreased by at least half thereof.

19. The method of claim 17, wherein said contacting step is a batch contacting step.

20. The method of claim 17, wherein said contacting step is a continuous contacting step.

21. The method of claim 17, wherein said contacting step is carried out in slurry reactor.

22. The method of claim 17, wherein said contacting step is carried out in a fixed bed reactor.

23. The method of claim 17, wherein said contacting step is carried out in a fixed bed reactor selected from the group consisting of trickle bed reactors and two phase upflow reactors.

24. The method of claim 17, wherein said polymer is polystyrene, which polystyrene is hydrogenated to produce polycyclohexylethylene.

* * * * *